A. GREENBERG.
SUBMARINE VESSEL.
APPLICATION FILED OCT. 7, 1916.

1,230,702.

Patented June 19, 1917.
2 SHEETS—SHEET 1.

WITNESSES
J. Herbert Bradley.
Was Leckman

INVENTOR
Abraham Greenberg
by C. M. Clarke
Atty

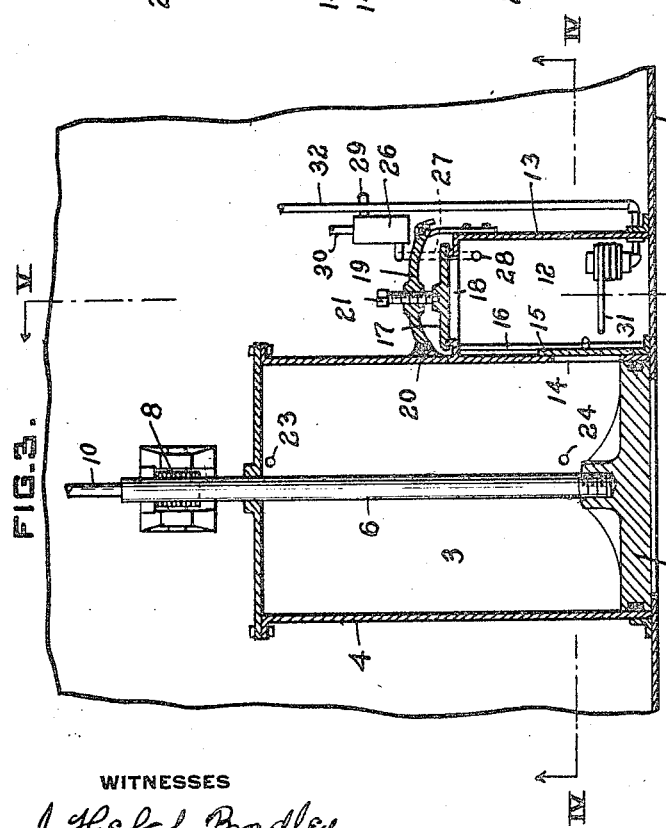

UNITED STATES PATENT OFFICE.

ABRAHAM GREENBERG, OF PITTSBURGH, PENNSYLVANIA.

SUBMARINE VESSEL.

1,230,702.

Specification of Letters Patent. Patented June 19, 1917.

Application filed October 7, 1916. Serial No. 124,290.

*To all whom it may concern:*

Be it known that I, ABRAHAM GREENBERG, a citizen of the United States, residing at Pittsburgh, in the county of Allegheny and State of Pennsylvania, have invented certain new and useful Improvements in Submarine Vessels, of which the following is a specification.

My invention refers to improvements in submarine vessels, and has in view to provide a construction by which the main interior of the vessel is capable of being put in communication with the exterior through a series of chambers provided with communicating openings, and means for closing said openings whereby to control the flow of water so as to permit of the passage therethrough to the exterior of an operator or operators each inclosed within a diving suit.

The invention comprises various features of construction and is adapted to operate in the manner hereinafter more fully described and illustrated in the drawings.

In the drawings,—

Fig. 3 is an enlarged sectional detail view of the same construction.

Fig. 4 is a cross sectional view, indicated by the line IV—IV of Fig. 3.

Fig. 5 is a similar sectional view, indicated by the line V—V of Fig. 3.

Fig. 6 is a partial sectional view, similar to Fig. 3, showing the plunger wall of the outer chamber retracted.

The main vessel 2, of any usual or conventional form common in vessels of the submarine class, may be provided with the necessary internal machinery and apparatus for effecting propulsion and raising or lowering of the vessel through the water, as will be readily understood, and not necessarily herein described.

My improvement consists in providing, in combination with the wall of the vessel 2, an outer chamber 3 within an inclosing water-tight wall 4 which may be fixedly mounted and so connected with the side wall of the main vessel as to form a practically continuous or integral part thereof.

Figure 2:
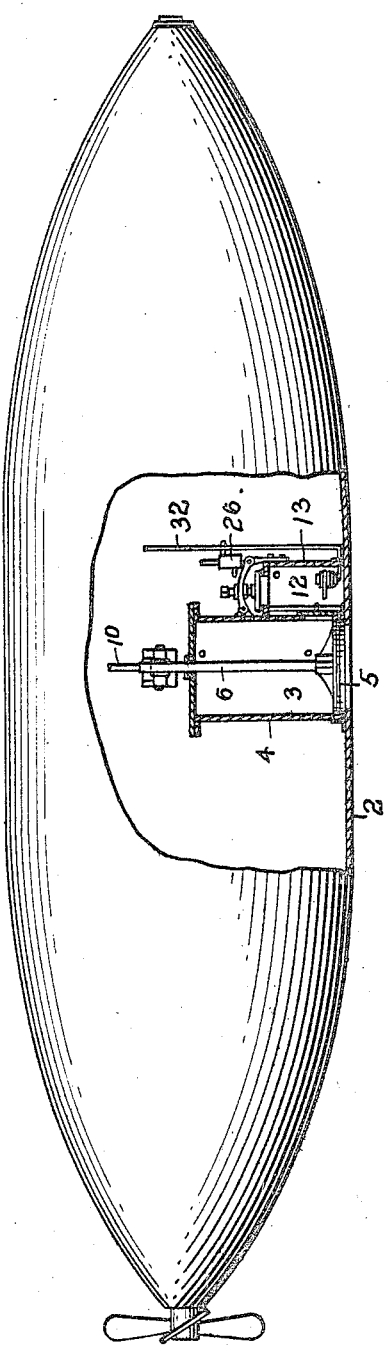
Fig. 2 is a plan view partly in section, showing the communicating chambers.

Chamber or compartment 3 is provided with a plunger wall 5 fitting within the shell 4 in the manner of a piston, and making practically water-tight sliding engagement therewith, so that when thrust outwardly to the limit of its travel, as in Figs. 2 and 3, it forms a portion of the side wall.

The plunger wall 5 is mounted on the end of a plunger rod or shaft 6 extending through the rear wall of casing 4 and into the main interior portion of the vessel 2. Rod 6 is actuated back and forth by any suitable means, as by a pinion 8 engaging the teeth of a rack 9 which extends rearwardly underneath stem 6, pinion 8 being geared with any suitable prime mover or engine by a shaft 10 and suitable gearing 11, as will be readily understood.

Alongside of chamber 3 is an inner chamber 12, similarly inclosed within a surrounding casing 13 incorporated with the side wall of the vessel, and in fixed adjacent location with relation to the chamber 3, and between said chamber is an intervening door opening 14. A suitable opening and closing door 15 is provided which may be conveniently mounted in slideways 16, so that it may be thrust open or closed by the occupant to open or close communication between the two chambers.

An additional entrance and exit door 17 is so mounted as to cover door opening 18 leading to the interior of the main vessel, whereby access may be had to or from chamber 12.

Door 17 is preferably mounted on a swinging arm 19 pivoted at 20 and provided with a supporting temper screw 21, so that when the door is closed over opening 18 it may be tightened thereon to positively seal the opening.

Opening 18 and its door are located at the upper portion of chamber 12 so as to permit of a considerable accumulation of water in the lower portion of said chamber without overflowing into the interior of the vessel.

For the purpose of permitting release of any contained water resulting from leakage around plunger 5, or excess air from chamber 3 upon backward movement of plunger wall 5, I provide a pipe 22 communicating between the rear portion of chamber 3 and its forward portion, as indicated at 23, 24, respectively, so that as plunger wall 5 is thrust backwardly, any contained water or air may escape through pipe 22 to the other end portion of the chamber, and in front of the receding plunger.

A check valve 25 is preferably inserted to prevent any back flow of water to the inner portion of the chamber.

Rod 6 may also pass through the rear wall of chamber 3 with sufficient clearance for a limited air circulation.

A pump 26 is also provided with a suction pipe 27 leading to the interior back portion of chamber 12, as indicated at 28, the pump having a discharge pipe 29 leading through the wall of the main vessel to its exterior, whereby any accumulation of water within chamber 12, when door 15 is closed, may be removed.

Pump 26 is provided with a suitable piston rod 30 and an actuating cylinder of well-known construction.

Figure 1:
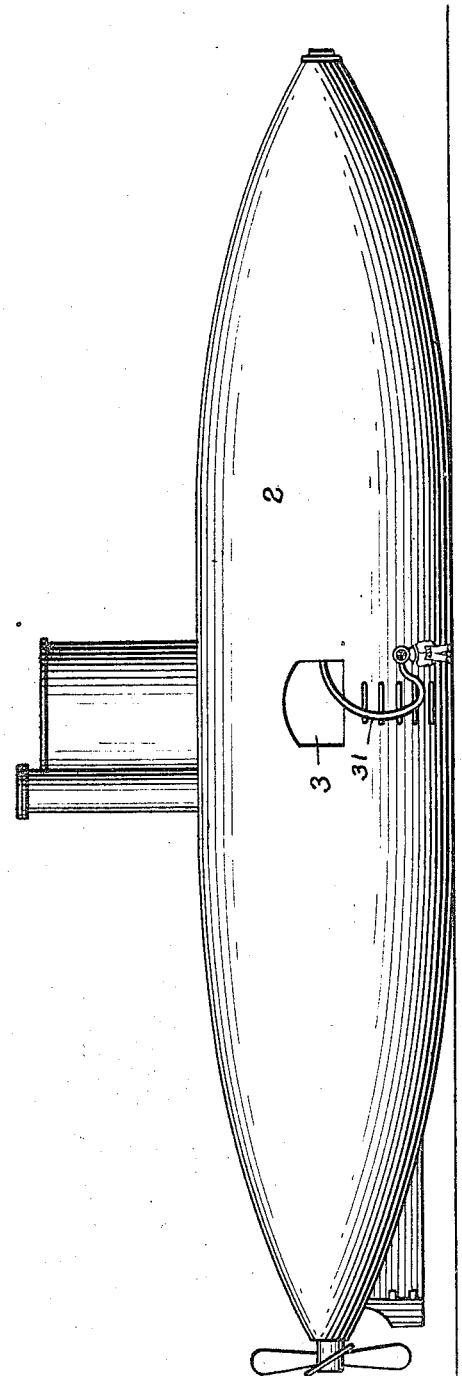
Figure 1 is a view of a conventional form of vessel in elevation provided with my improvement.

Within chamber 12 is located the air line 31 communicating through the wall of the chamber by pipe 32 to any suitable air supply apparatus, pipe 31 being utilized in the well-known manner of supplying air to an ordinary diver's suit, as indicated in Fig. 1.

The operation of the invention is as follows:

Assuming the apparatus to be in the position shown in Fig. 3, with the plunger wall 5 making a practically tight fit against the outer wall of the vessel and closing the opening therethrough, door 17 is thrown open and the operator enters chamber 12, and he then is incased within the diving suit. Incidentally, the suit may be equipped with the usual telephone or electric signaling devices, so that the diver can inform the operators within the main interior at all times as to his condition and the necessary operation of the different parts of the entire mechanism.

Door 17 being then closed and hermetically sealed, the diver opens door 15, preferably before there is any water pressure against it, and plunger 5 is then receded backwardly beyond opening 14 to any desired extent, as indicated in Fig. 6. Water will then fill chamber 12, but will pass no farther, and access being opened to the exterior of the vessel, the diver can then pass out and operate within the limitations of the length of hose 31.

Upon returning through the main opening into the front portion of chamber 3 and backwardly into chamber 12, he then closes door 15 and signals for the closing of plunger 5.

Outward movement of plunger 5 will expel practically all of the water in front of it, so that the only water then contained is that within chamber 12. The operator then opens door 15, whereupon the water will flow into chamber 3 and down to a common level, quite sufficiently below the lower edge of opening 18, leaving the upper portion of the chamber empty.

Incidentally, any excess water within chamber 12 may be then pumped out, if desired, by a pump 26, and the diver is then free to remove the suit and to pass backwardly into the interior through opening 18 upon opening of door 17.

The construction and operation of the invention is comparatively simple, safe and durable, it is not liable to get out of order, and is economical in construction and maintenance.

It will be understood that the chambers and the attendant parts may be of any desired or preferred design, size or proportions, and that various changes in construction or details may be made by the skilled mechanic within the scope of the following claims.

What I claim is:

1. In a submarine vessel, an outer chamber communicating with the exterior thereof provided with a reciprocable plunger wall, fitting closely to the sides of the chamber, and an adjacent chamber provided with a closing door communicating with said first chamber and having a door opening into the interior of the main vessel.

2. In a submarine vessel, an outer chamber communicating with the exterior thereof provided with a reciprocable plunger wall, fitting closely to the side of said chamber in all positions, and an adjacent chamber provided with a closing door communicating with said first chamber and having a door opening into the interior of the main vessel, and means for exhausting water therefrom.

3. The combination with the main vessel, of an outer chamber communicating with the exterior thereof and provided with a reciprocable sealing plunger wall, said wall being adapted to prevent inflow of water above it at all positions and adapted to expel the water from said chamber on its outward movement, and an inner chamber having a door-controlled communication with said first chamber, and provided with a supplemental opening and a closing door at its upper end portion communicating with the interior of the main vessel.

4. In a submarine vessel, an outer cylindrical chamber having its outer end open and communicating with the exterior thereof, a reciprocable plunger in close contact with the sides of said chamber and forming a sealing closure for said opening, said plunger being adapted to be moved inwardly to permit inflow of water to said chamber and to be lowered to expel the water therefrom, and an inner chamber having an opening communicating with said first named chamber, and a sliding door for closing said opening, said last named chamber also being provided with a supplemental opening and a closing door at its inner end portion, communicating with the interior of the main vessel.

In testimony whereof I hereunto affix my signature.

ABRAHAM GREENBERG.